United States Patent Office 3,286,511
Patented Nov. 22, 1966

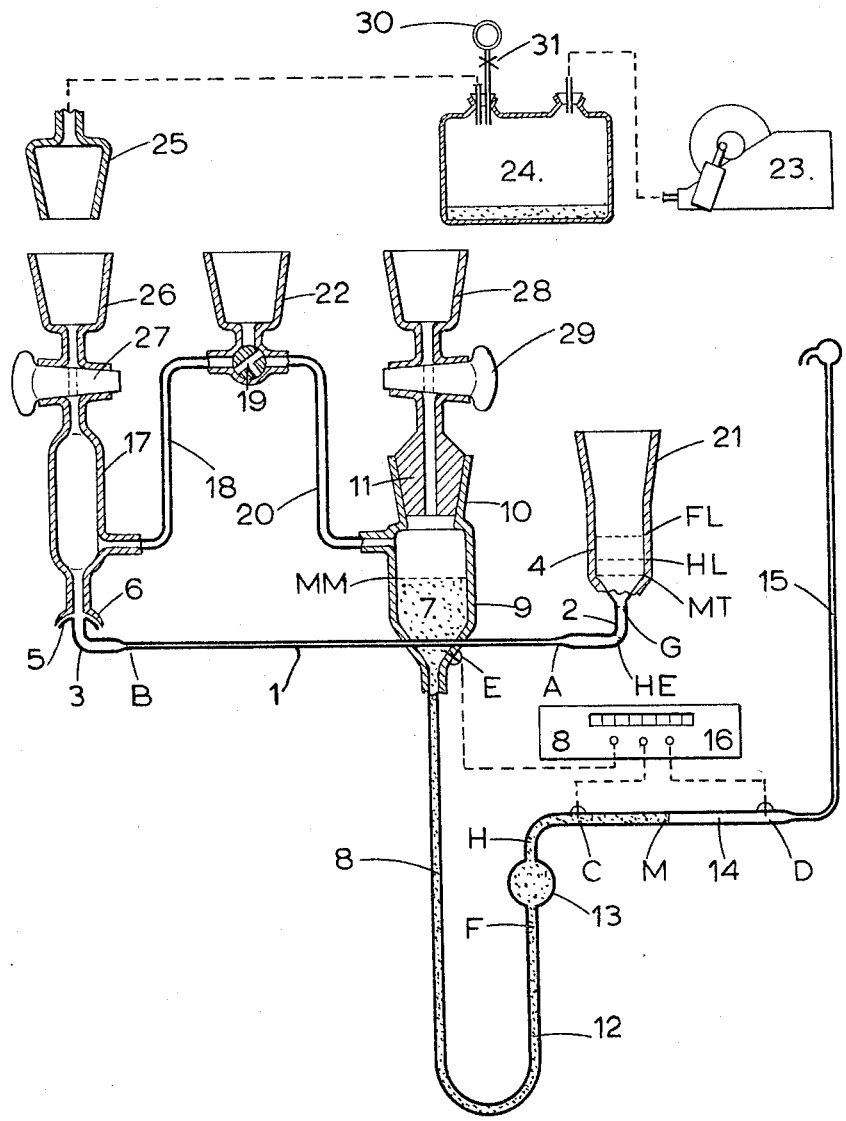

3,286,511
VISCOSITY MEASUREMENT
John Harkness, Taunton, England, assignor to Coulter Electronics, Inc., Hialeah, Fla., a corporation of Illinois
Filed Jan. 15, 1964, Ser. No. 337,801
Claims priority, application Great Britain, Jan. 17, 1963, 2,166/63
11 Claims. (Cl. 73—55)

This invention relates to apparatus for measuring the viscosity of liquids and to methods of testing the viscosity of liquids.

One method of measuring the viscosity of a liquid is to cause it to flow along a fine transparent tube, usually a capillary tube, and to note the time taken for the liquid to pass between two spaced points on the tube. Then the viscosity can be determined from the time interval so obtained by comparing the time of flow with the time taken by a standard fluid, such as water or aniline, having a viscosity that is already known in identical conditions of temperature, pressure and so forth. This is a tedious procedure and liable to error so that one object of the present invention, which is particularly well adapted to the measurement of the viscosity of blood plasma, is to provide reasonably simple means for automatically recording the time interval.

According to the invention, in a method of testing the viscosity of a liquid, a stream of liquid, including at least a section consisting of the liquid of which the viscosity is to be tested, is caused to flow along a duct system including a fine tube along which the said section of liquid travels, and the instants at which the stream reaches two spaced points are electrically registered so as to give the time interval during which the said section travels along a known length of the fine tube. Preferably the stream is caused to travel under the action of a known force, such as gravity, and then the required gravitational and electrical effects may be obtained, in apparatus according to the invention, by the use of mercury as part of the liquid stream, the mercury being arranged in what is essentially a U tube so as to pass from a state of unstable equilibrium to a state of stable equilibrium therein, and in so doing to travel between electrodes at the two said points. A third liquid, such as water, may be interposed between the mercury and the liquid to be tested.

In order that the invention may be clearly understood and readily carried into effect, a method and apparatus in accordance therewith will now be described, by way of example, with reference to the accompanying diagrammatic drawing.

In this example, the fluid, of which the viscosity is to be measured, is drawn along a fine capillary tube 1 that extends between points A, B at which it joins passages 2, 3 that extend upwards respectively to a receiving vessel 4 and a ball 5 of a ball-and-socket joint 6.

The fluid is drawn through the capillary tube 1 as a result of suction due to the fall of mercury 7 in a vertical column 8 including a bulbous portion 9 having a mouth 10 in which a plug 11 is a cone fit. The lower end of the column 8 is joined by a bend with a vertical limb 12 having a bulb 13 leading into a horizontal limb 14 which terminates in a vertical limb 15 open at the top to the atmosphere. Electrodes extend into the horizontal limb 14 at points C, D and these electrodes are connected to a timer 16. A third neutral electrode E is inserted into the column 8, and is connected to the timer 16. This timer incorporates a device made by Coulter Electronics Inc., particularly for use in apparatus for counting particles. The timer contains a start circuit connected to the electrode at C and a stop circuit connected to the electrode at D. The timer also includes an electrical pulse generator having a frequency of one hundred impulses per second.

The manner in which the apparatus is operated will now be described and, in this connection, it will be appreciated that the mass of mercury 7 is first allowed to take up an equilibrium condition in which its ends are both open to atmospheric pressure and are at the same level respectively in the bulbous portion 9 and in the vertical limb 15. The whole system between the top of the mercury in the column 8 and the unit 4 is then filled with a liquid such as water, referred to below as water. The water then extends from the vessel 4, through the passage 2, the capillary tube 1, the passage 3, the joint 6, a bulb 17, a tube 18, a three-way valve 19, a tube 20, to the column 8 which the water fills above the mercury in the bulbous portion 9.

The water is inserted by first filling the vessel 4 to the top of its upper funnel extension 21, and by filling a funnel 22 above the valve 19. A pump 23 is then caused to apply suction through a Wolff bottle 24 and a nozzle 25, which is a taper fit in a funnel 26 above a valve 27, by which the top of the bulb 17 may be closed. During this operation, however, the valve 27 is open and the valve 19 is turned to a position in which the tube 18 is disconnected from the tube 20, but in which the funnel 22 is in communication through the tube 18 with the bulb 17. Therefore, the suction serves to fill the bulb 17 and tube 18 with water. The valve 27 is then closed.

Next water is poured into a funnel 28, this funnel being above a valve 29, which controls the flow through the unit 11 and is kept open during this operation. The nozzle 25 is transferred from the funnel 26 to the funnel 22 in which it is also a taper fit, but, prior to this, the valve 19 is turned to a position in which the funnel 22 is in communication with the tube 20 and is disconnected from the tube 18. The suction therefore, causes the water from the funnel 28 to fill the space above the mercury 7 in the bulbous portion 9, as well as the tube 20. Now the valve 29 is closed and the valve 19 is turned to the position in which it puts the tubes 18, 20 in communication with one another but closes the bottom of the funnel 22.

The nozzle 25 is thereupon returned to the funnel 26 and the valve 27 is opened so that the suction draws water from the bulb 17, causing the mercury to rise in the bulbous portion 9 and to move downwards in the conduit system 12, 13, 14, 15. Then, when the mercury reaches a point F immediately below the bulb 13, an air leak device 30 is adjusted to keep the mercury level constant at a point F, immediately below the bulb 13. To enable this to be done, the device 30 incorporates a diaphragm which is manually pre-set to apportion the amount of suction that can take place through the nozzle 25 and the amount of suction that is drawn from the ambient atmosphere. When the aforesaid state of equilibrium is achieved at the point F, all the dynamic suction takes place from the ambient atmosphere. The valve 27 is then closed so that the mercury is allowed to suck the water through the conduit comprising the space above the mercury in the bulbous portion 9, the tubes 20, 18, the bulb 17, the passage 3, the capillary tube 1, the passage 2 and the vessel 4, until equilibrium is again reached. Finally surplus water is removed from the vessel 4 to the level of a point G at the top of the passage 2. The instrument is now ready for use.

In use, a measured volume of the test fluid is introduced into the base of the vessel 4. This measured volume is equal to the capacity of the conduit between the point F and the point in the vertical limb 15 at which the mercury level is located when the mercury is in its equilibrium condition. Most of this capacity is in the bulb 13, which is selected according to the characteristics of the test fluid, particularly its surface tension. The test fluid has its surface at the level FL in the vessel 4.

The valve 27 is opened once more to apply suction to the water and mercury, and when the end of the mercury again reaches the point F, the valve 27 is closed and the timer 16 is set to zero. The mercury in the column 8 now falls under gravity, drawing water through the tubes 20, 18, the bulb 17 and the capillary tube 1, while the lower end of the mercury column rises through the bulb 13 and travels along the limb 14 to the electrode at C. Thereupon the low electrical resistance of the mercury completes a circuit causing the timer to start. By the time the mercury has reached the electrode at C, the test fluid that has passed along the capillary tube 1 is sufficient to remove all traces of the preceding water from the capillary tube wall. When the mercury reaches the electrode at D, it causes the timer to stop. The time measured is that taken by a measured volume of the test fluid, equal to the capacity of limb 14 between the points C and D, to pass through the capillary tube and from this time the viscosity can be calculated.

On again reaching equilibrium, this test liquid reaches the point G. The next fluid can now be added without the need to wash and dry, as the flow of the second fluid, corresponding to the rise of mercury from F to C, removes the traces of the first fluid from the capillary tube wall.

An alternative faster technique is possible by leaving an air space between samples. The mercury is adjusted to move only as far as a point H; the volume of test fluid fills the vessel 4 only as far as HL and at equilibrium the level is at HE in passage 2.

The capillary is adjusted through the joint 6 so that when the mercury is half-way between C and D, at point M, the level MT of the test fluid in the vessel 4, is the same as the level MM of the mercury in the bulbous portion 9 of the column 8. Under such conditions the driving force is due entirely to the mercury column, the other hydrostatic forces balancing out.

The only likely source of error is the blockage of the capillary tube 1 at point A by dust falling into the vessel 4 or by tiny clots in the test fluid. These are readily removed by operating the valve 19 to open the funnel 22 to the tube 18 and applying suction through the nozzle 25 to the funnel 21 in which that nozzle 25 is also a cone fit. If mild suction is insufficient to remove the obstruction, a valve 31 is closed to cut out the air leak device 30 without interference with its setting, and the suction is again applied to the funnel 21. For thorough cleaning with bichromate and sulphuric acid, the capillary tube 1 can be detached at the joint 6 and filled with the viscous cleaning fluid by suction at the funnel 21.

I claim:

1. A method of testing the viscosity of a test liquid which comprises the steps of drawing a known volume of test liquid through a horizontally arranged capillary tube under the influence of a gravitationally descending columnar stream of non-test liquid and registering the time interval required for the leading end of the stream of non-test liquid to traverse the distance between a pair of points, said distance being related directly to said known volume and the inner diameter of the tube being selected to exert a viscous drag on the test liquid whereby the rate of travel of said leading end between said pair of points is indicative of the viscosity of the test liquid.

2. The method of claim 1 in which the portion of the stream of non-test liquid that traverses the two points consists of mercury and the time interval is registered electrically by using the leading end of said stream to activate and deactivate a timer mechanism.

3. The method as claimed in claim 1 in which successive test samples are fed to said capillary tube.

4. The method as claimed in claim 1 in which successive samples of test liquid are fed to said capillary tube and an air space is used to separate each such sample.

5. Apparatus for testing the viscosity of a test-liquid including a conduit system having in series a substantially horizontal capillary tube and a column through which a stream of non-test liquid can be allowed gravitationally to fall for applying suction to one end of said tube to draw the test liquid therethrough, means for feeding the test liquid into the other end of said tube, a pair of electrodes arranged spaced apart on said column a pre-determined distance and communicating to the interior of the column, a timer connected to said electrodes for electrically registering the time interval which is taken by the forward end of the stream of non-test liquid, including the non-test liquid in the column and the test liquid to traverse the distance between said electrodes, the inner diameter of the tube being chosen so that the tube exerts a viscous drag on the test liquid whereby the rate at which the stream of non-test liquid traverses the distance between the two points is determined by the viscosity of the test liquid.

6. Apparatus as claimed in claim 5, in which the portion of the stream of non-test liquid that traverses the distance between said electrodes is mercury, whereby the conductive properties of the mercury control the timer.

7. Apparatus as claimed in claim 6, in which the lower end of the column is connected by a U-shaped bend to a vertical first limb including a first bulb and leading into a second limb containing the electrodes, the column being arranged so that the mercury in the vertical limb is drawn below the bulb prior to each test.

8. Apparatus as claimed in claim 7, in which the second limb is horizontal relative to the first limb and leads into an upwardly extending vertically arranged third limb.

9. Apparatus as claimed in claim 5, in which said means for feeding the test liquid into the capillary tube comprises a funnel extending upwardly from the capillary tube, a second bulb disposed at a higher level than the tube and connected to the outlet end of the capillary tube, said second bulb being connected to a third bulb disposed at the top of said column.

10. Apparatus as claimed in claim 9, in which there are first and second valves, a three-way valve and a suction pump connected to said conduit system at three points therealong, one being by way of the first valve to said second bulb, the second being by way of the second valve to said third bulb portion of the column, and the third being to the three way valve between the said second bulb and third bulb, whereby to permit suction to be applied for the purpose of filling the conduit system and for raising non-test liquid in the column.

11. Apparatus as claimed in claim 6 wherein a third liquid is introduced between the test liquid and the mercury.

References Cited by the Examiner

UNITED STATES PATENTS

| | | | |
|---|---|---|---|
| 2,048,305 | 7/1936 | Ubbelohde | 73—55 |
| 2,353,382 | 7/1944 | Barrett | 73—194 X |
| 2,674,118 | 4/1954 | Westmoreland | 73—55 X |
| 3,081,621 | 3/1963 | De Bruyne | 73—55 |

DAVID SCHONBERG, *Primary Examiner.*